United States Patent
Tio

(10) Patent No.: US 7,550,635 B2
(45) Date of Patent: Jun. 23, 2009

(54) PROCESS FOR THE PREPARATION HYDROGEN AND A MIXTURE OF HYDROGEN AND CARBON MONOXIDE

(75) Inventor: Thian Hoey Tio, Amsterdam (NL)

(73) Assignee: Shell Oil Company, Houston, TX (US)

( * ) Notice: Subject to any disclaimer, the term of this patent is extended or adjusted under 35 U.S.C. 154(b) by 581 days.

(21) Appl. No.: 10/552,854

(22) PCT Filed: Apr. 13, 2004

(86) PCT No.: PCT/EP2004/050500

§ 371 (c)(1),
(2), (4) Date: Oct. 12, 2005

(87) PCT Pub. No.: WO2004/092061

PCT Pub. Date: Oct. 28, 2004

(65) Prior Publication Data

US 2007/0140954 A1    Jun. 21, 2007

(30) Foreign Application Priority Data

Apr. 15, 2003    (EP) .................................. 03076114

(51) Int. Cl.
*C01B 3/24* (2006.01)
*C01B 3/26* (2006.01)
*C07C 5/02* (2006.01)
*C07C 5/22* (2006.01)
*C07C 27/06* (2006.01)

(52) U.S. Cl. ........................ 585/250; 423/650; 423/651; 423/652; 423/653; 423/654; 518/703; 518/704; 585/253

(58) Field of Classification Search ................ 423/650, 423/651, 652, 653, 654; 252/373; 518/703, 518/704; 585/250, 253
See application file for complete search history.

(56) References Cited

U.S. PATENT DOCUMENTS

| | | | | |
|---|---|---|---|---|
| 4,650,651 A | * | 3/1987 | Fuderer | 422/191 |
| 4,943,672 A | | 7/1990 | Hamner et al. | 585/737 |
| 5,059,299 A | | 10/1991 | Cody et al. | 208/27 |

(Continued)

FOREIGN PATENT DOCUMENTS

DE    3345088    6/1985

(Continued)

OTHER PUBLICATIONS

Intl Search Report dated Aug. 13, 2004 (PCT/EP2004/050500).

(Continued)

*Primary Examiner*—Wayne Langel

(57) ABSTRACT

Process for the preparation hydrogen and a mixture of hydrogen and carbon monoxide containing gas from a carbonaceous feedstock by performing the following steps: (a) preparing a mixture of hydrogen and carbon monoxide having a temperature of above 700° C. (51); (b) catalytic steam reforming a carbonaceous feedstock in a Convective Steam Reformer zone (44), wherein the required heat for the steam reforming reaction is provided by convective heat exchange between the steam reformer reactor zone and the effluent of step (a) to obtain as separate products a steam reforming product having a hydrogen to CO molar ratio of greater than 2 and a cooled effluent of step (a), and (c) separating hydrogen from the steam reforming product.

11 Claims, 1 Drawing Sheet

U.S. PATENT DOCUMENTS 6,224,789 B1    5/2001    Dybkjaer .................... 252/373

FOREIGN PATENT DOCUMENTS

| EP | 0168892 | 1/1986 |
| --- | --- | --- |
| EP | 0291111 | 11/1988 |
| EP | 0440258 | 8/1991 |
| EP | 0776959 | 6/1997 |
| EP | 0983964 | 3/2000 |
| EP | 1146009 | 10/2001 |
| GB | 1093943 | 12/1967 |
| NL | 8403144 | 5/1986 |
| WO | 88/01983 | 3/1988 |
| WO | 93/06041 | 4/1993 |
| WO | 96/03345 A1 | 2/1996 |
| WO | 96/39354 | 12/1996 |
| WO | 97/22547 | 6/1997 |
| WO | 99/20720 | 4/1999 |
| WO | 99/34917 | 7/1999 |
| WO | 01/07538 | 2/2001 |
| WO | 01/37982 | 5/2001 |
| WO | 01/55027 | 8/2001 |
| WO | 02/070627 | 9/2002 |
| WO | 02/070629 | 9/2002 |
| WO | 02/070631 | 9/2002 |

OTHER PUBLICATIONS

Intl Preliminary Report on Patentability (PCT/EP2004/050500).
Partial oxidation grows stronger in U.S., Oil and Gas Jrnl. Sep. 6, 1971, p. 85-90, vol. 69. No. 36.

* cited by examiner

US 7,550,635 B2

PROCESS FOR THE PREPARATION HYDROGEN AND A MIXTURE OF HYDROGEN AND CARBON MONOXIDE

The present application claims priority on European Patent Application 03076114.2 filed 15 Apr. 2003.

FIELD OF THE INVENTION

The invention relates to a process for the preparation of hydrogen and a mixture of hydrogen and carbon monoxide.

BACKGROUND OF THE INVENTION

EP-A-168892 describes an endothermic steam reforming reaction, which is carried out in a fixed bed situated in at least one pipe in which a temperature of between 800 and 950° C. is maintained by routing at least part of the hot product gas from a partial oxidation reaction along the pipe(s). According to this publication the combined partial oxidation and endothermic production of synthesis gas result in a better yield of synthesis gas, an increased $H_2/CO$ ratio, a lower usage of oxygen per $m^3$ of synthesis gas product obtained and a lower capital cost of the plant for the production of CO and $H_2$-containing gas mixtures (as compared to partial oxidation).

A reactor and process for performing a steam reforming reaction is described in DE-A-3345088. This publication describes a reactor vessel for performing a steam reforming reaction starting from a natural gas feedstock. The vessel consisted of a tube sheet from which a plurality of tubes filled with a suitable catalyst extended into the vessel. The required heat of reaction is provided by passing the hot effluent of a partial oxidation reaction of natural gas at the exterior of the reactor tubes in the vessel. Such steam reformer reactors are also referred to as so-called convective steam reformer (CSR) reactors.

U.S. Pat. No. 6,224,789 discloses a process wherein synthesis gas is prepared in a combination of an autothermal steam reforming step and a convective steam reforming step.

WO-A-8801983 discloses a convective steam reforming reactor vessel wherein the hot gas, which is used to heat the reactor tubes, is obtained by burning heating gas in a lower part of the vessel.

The synthesis gas as obtained in the above processes may be used as feedstock in a Fischer-Tropsch process. In typical Fischer-Tropsch processes hydroprocessing steps are performed to covert the Fischer-Tropsch synthesis paraffinic product into valuable products as detergent feedstock, solvents, naphtha, kerosene, gas oil, lubricating base oils and waxes having varying congealing points. Typical hydroprocessing steps are hydrogenation, hydroisomerization, hydrocracking and catalytic dewaxing. For these steps hydrogen is needed. It would be useful to provide an efficient process to simultaneously prepare hydrogen and synthesis gas.

SUMMARY OF THE INVENTION

The invention provides a process for the preparation of hydrogen and a mixture of hydrogen and carbon monoxide containing gas from a carbonaceous feedstock by performing the following steps:
(a) preparing a mixture of hydrogen and carbon monoxide having a temperature of above 700° C.
(b) catalytically steam reforming a carbonaceous feedstock in a Convective Steam Reformer zone, wherein the required heat for the steam reforming reaction is provided by convective heat exchange between the steam reformer reactor zone and the effluent of step (a) to obtain as separate products a steam reforming product having a hydrogen to carbon monoxide molar ratio of greater than 2 and a cooled effluent of step (a), and
(c) separating hydrogen from the steam reforming product. The invention further provides the additional steps of:
(d) catalytically converting the hydrogen and carbon monoxide into a stream comprising hydrocarbons via a Fischer-tropsch process, and
(e) separating the stream of step (d) into a hydrocarbon product and a gaseous recycle stream and also optionally
(f) hydroprocessing the hydrocarbon product of step (e) with the hydrogen from step (c).

DETAILED DESCRIPTION OF THE INVENTION

Figure 1:
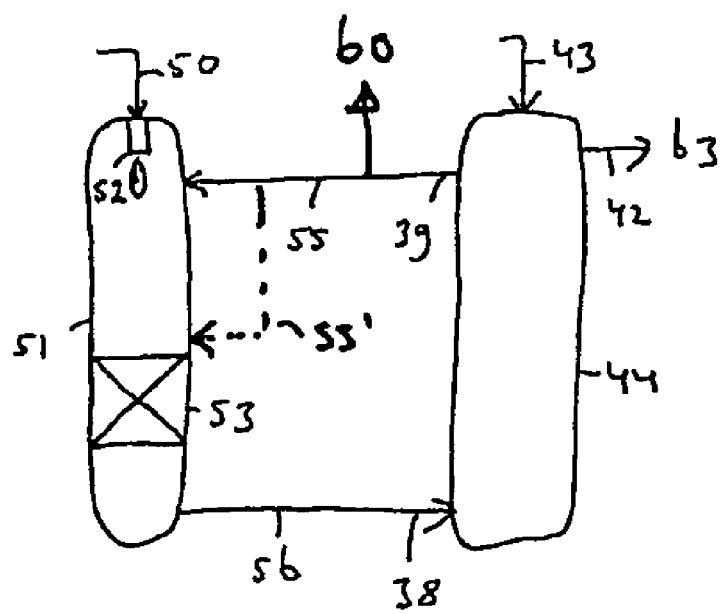
FIG. 1 illustrates the combination of a partial oxidation reactor with a convective steam reforming reactor vessel.

Step (a) may be performed by any process which yields a mixture of hydrogen and carbon monoxide having the required heat capacity to provide the required heat to the convective steam reformer zone in step (b).

Step (a) may be performed in a well known conventional steam reformer, wherein a hydrocarbon feedstock is passed through tubes filled with steam reformer catalyst and wherein the required heat is supplied by burners exterior of the reactor tubes. Examples of such a steam reforming process step are for example disclosed in WO-A-9315999 and EP-A-171786. The feedstock is preferably a methane containing feedstock such as natural gas.

A preferred embodiment for step (a) is the well known autothermal reformer process. The feedstock of the autothermal reformer may be a hydrocarbon containing feedstock such as natural gas. Preferably part of the steam reformer product as prepared in step (b) is used as feed in step (a) wherein it is partially oxidized with an oxygen containing gas in the autothermal reformer. Such an autothermal reformer step may be performed in a conventional type autothermal reformer reactor consisting of a refractory lined, possibly water jacketed vessel, to which the feed is supplied to a suitable burner nozzle. The products of the resulting flame reaction are brought towards equilibrium over a nickel secondary reforming catalyst as present in the catalyst bed in the lower part of such an autothermal reformer reactor vessel.

Another preferred embodiment for step (a) is the non-catalyzed partial oxidation partial oxidation of the carbonaceous feedstock and oxygen. An advantage of performing a partial oxidation or an autothermal reformer in step (a) is that the hydrogen to carbon monoxide molar ratios of the combined synthesis gas products of step (a) and partly in step (b) can be from 1.5 up to 3 and even preferably from 1.9 up to 2.3 making the synthesis gas product suitable for various applications as will be discussed here below.

The carbonaceous feedstock in the partial oxidation and in step (b) is preferably a gaseous hydrocarbon, suitably methane. In the context of the present invention, a methane feedstock includes natural gas, associated gas or a mixture of $C_{1-4}$ hydrocarbons. The gaseous hydrocarbon suitably comprises mainly, i.e. more than 90 v/v %, especially more than 94%, $C_{1-4}$ hydrocarbons, especially comprises at least 60 v/v percent methane, preferably at least 75 percent, more preferably 90 percent. Preferably natural gas or associated gas is used. Preferably any sulfur in the feedstock is removed prior to using said gas as feedstock in step (b) and optionally in step (a).

Preferably the feed in the partial oxidation or in the conventional steam reforming processes for step (a) and for step (b) is a gaseous feed as described above. In such a preferred embodiment from 10 wt % to 90 wt %, more preferably from 20 wt % to 50 wt %, of the total gaseous feed to steps (a) and (b) is fed to step (b).

In step (a) the partial oxidation may be performed according to well known principles as, for example, described for the Shell Gasification Process in the Oil and Gas Journal, Sep. 6, 1971, pp 85-90. Publications describing examples of partial oxidation processes are EP-A-291111, WO-A-9722547, WO-A-9639354 and WO-A- 9603345. In such processes the feed is contacted with an oxygen containing gas under partial oxidation conditions preferably in the absence of a catalyst.

The oxygen containing gas may be air (containing about 21 percent of oxygen) and preferably oxygen enriched air, suitably containing up to 100 percent of oxygen, preferably containing at least 60 volume percent oxygen, more preferably at least 80 volume percent, more preferably at least 98 volume percent of oxygen. Oxygen enriched air may be produced via cryogenic techniques, but is preferably produced by a membrane based process, e.g. the process as described in WO-A-9306041.

Contacting the feed in a partial oxidation process step with the oxygen containing gas in step (a) is preferably performed in a burner placed in a reactor vessel. To adjust the hydrogen to carbon monoxide ratio in the gaseous product obtained in the partial oxidation reaction in step (a), carbon dioxide and/or steam may be introduced into the feed. Preferably up to 15% volume based on the amount of gaseous product, preferably up to 8% volume, more preferably up to 4% volume, of either carbon dioxide or steam is added to the feed. As a suitable steam source, water produced in an optional downstream hydrocarbon synthesis may be used.

The gaseous product of the partial oxidation reaction in step (a) preferably has a temperature of between 1100° C. and 1500° C. and a hydrogen to carbon monoxide molar ratio of from 1.5 up to 2.6, preferably from 1.6 up to 2.2.

Step (b) may be performed by well-known steam reforming processes, wherein steam and the gaseous hydrocarbon feed are contacted with a suitable reforming catalyst in a convective steam reformer reactor. The convective steam reactor zone preferably comprises a tubular reactor vessel provided with one or more tubes containing a reforming catalyst. Various designs for such a reactor are known and suited for the present invention. Examples of such reactors are described in WO-A-0137982, EP-A-983964 or WO-A-8801983.

The catalyst and process conditions as applied in the convective steam reformer zone may be those known by the skilled person in the field of steam reforming. Suitable catalysts comprise nickel optionally applied on a carrier, for example, alumina. The space velocity of the gaseous feed is preferably from 700 liter to 1000 liter (S.T.P.)/liter catalyst/hour, wherein S.T.P. means Standard Temperature of 15° C. and pressure of 1 bar abs. The steam to carbon (as hydrocarbon and carbon monoxide) molar ratio is preferably from 0 up to 2.5 and more preferably below 1 and most preferably from 0.5 up to 0.9. If such low steam to carbon ratios are applied in step (b) the catalyst preferably comprises a Group VIII metal. More preferably the catalyst comprises (a) an oxidic support material and (b) a coating comprising between about 0.1 and about 7.0 wt % of at least one of the metals selected from the group consisting of Pt, Ni, Pd and Co, preferably platinum; said support material comprising: (i) at least 80 wt % of $ZrO_2$ which has been calcined at a temperature up to about 670° C. before the application of said coating; (ii) 0.5-10 mol % of at least one oxide selected from the group consisting of oxides of Y, La, Al, Ca, Ce and Si, preferably $La_2O_3$. Examples of such catalysts include, for example the catalyst described in EP-A-695279. Preferably, the feed also comprises an amount of carbon dioxide, wherein preferably the carbon dioxide to carbon (as hydrocarbon and carbon monoxide) molar ratio is from 0.5 up to 2. The product gas of step (b) preferably has a temperature of from 600 ° C. up to 1000° C. and a hydrogen to carbon monoxide molar ratio of from 0.5 up to 2.5.

The temperature of the hydrogen and carbon monoxide containing gas of step (a) is preferably reduced in step (b) from a temperature of from 1000 ° C. up to 1500° C. to a temperature from 300 ° C. up to 750° C. The temperature of the metal wall surfaces of the reactor tubes in the convective steam reformer zone in step (b) is preferably maintained below 1100° C.

The mixture of carbon monoxide and hydrogen (steam reformer product) may be used exclusively to prepare hydrogen or may partly also be combined with the product gas as obtained in step (a), provided to the partial oxidation reactor of step (a) or used as feedstock in case an autothermal reformer is used in step (a) as explained above. Suitably more than 10 vol % of the steam reformer product as obtained in step (b) is used in step (c).

In a preferred embodiment part of the steam reforming product as obtained in step (b) is fed to step (a) in case step (a) is a partial oxidation process step. The invention is also directed to encompass below process embodiments wherein a convective steam reactor is used which has separate outlets for the steam reactor product and the cooled effluent of step (a). An advantage of mixing part of the steam reformer product of step (b) with the feed to step (a) or more preferably directly into the partial oxidation reactor of step (a) is that any methane or higher gaseous hydrocarbon, which may still be present in the steam reformer product, is then further converted to hydrogen and carbon monoxide. This is especially advantageous when the steam reforming step (b) is performed on a feed having a steam to carbon ratio of less than 1, especially between 0.5 and 0.9. Operating the process with a lower steam to carbon ratio in the feed to step (b) is advantageous because the resulting synthesis gas product will then also contain less steam and because smaller reactor equipment may be applied. However, by operating step (b) at a low steam to carbon ratio more unconverted methane will be present in the steam reformer product. This is resolved by routing part of the steam reformer product to step (a). The combined mixture is used in step (b) to provide the required reaction heat for performing step (b).

The above embodiment is illustrated in FIG. 1. FIG. 1 shows the convective steam reforming reactor vessel (44). For clarity reasons no internals of vessel (44) are shown in FIG. 1. Also shown is a partial oxidation reactor (51) provided with a burner (52). A carbonaceous feed (50) and an oxygen containing gas (50') is supplied to burner (52). Also shown is that the product gas (55) of step (b) is fed to the upper half of the reactor vessel (51).

Preferably the steam reformer product (55) is fed close, i.e. in the upper half of elevated vessel (51), to the burner (52) in order to benefit the most from the resultant temperatures of from 800 ° C. up to 1050° C. present in that region of the vessel (51) enabling conversion of methane which may be present in product (55). The methane content in steam reformer product (55) may be between 5 mol % and 30 mol % carbon relative to the carbon as hydrocarbon in the feed to step (b), (43). This relatively high methane content is a results when operating step (b) at relatively lower temperatures and/or at relatively low steam to carbon ratio as described before. Low temperatures in step (b) are suitably between 700 ° C. and 800° C. as measured on steam reformer product (55) as it leaves the reactor (44). A low temperature is desirable for material strength reasons for the internals used in reactor (44).

Another embodiment which aims at operating step (b) such that the temperature of the reactor (44) internals is kept at acceptable levels is by allowing on the one hand a higher outlet temperature for steam reformer product (55) and on the other hand reducing the temperature of (56). This is achieved by mixing steam reformer product, shown as dotted line (55'), with the gaseous product of the partial oxidation reaction at a position spaced away from the burner (52), such that no significant conversion of methane present in steam reformer product (55') will take place when mixing these two streams. Preferably mixing is performed in the lower part of reactor vessel (51). Due to mixing of the product of the partial oxidation reaction having a temperature of between 1100 ° C. and 1500° C. and steam reformer product (55) having a considerable lower temperature a temperature reduction relative to the temperature of the product of the partial oxidation reaction of between 250 ° C. and 500° C. will result.

Because the outlet temperature of steam reformer product (55') is suitably higher than in the above described embodiment stream steam reformer product (55') will have a relatively lower methane content, suitably between 1 mol % and 10 mol % carbon and preferably between 2 mol % and 5 mol % carbon relative to the carbon as hydrocarbon in the feed to step (b), (43).

This methane is preferably converted in a preferred autothermal reformer step reactor (g), also referred to as catalytic post reforming as present in the lower half of vessel (51). The post reforming catalyst bed (53) may be any well-known reformer catalyst, for example a Ni-containing catalyst or any catalyst described above for the convective steam reforming reactor. The effluent of the autothermal reformer step (g) is subsequently fed to inlet (38) of convective steam reforming reactor vessel (44), wherein the gasses supply heat to the convective steam reforming zone. The final synthesis gas product (63) is obtained via outlet (42).

In step (g) a temperature reduction is achieved of suitably between 20 ° C. and 70° C. and preferably between 40 ° C. and 60° C. Stream (56) as obtained in step (g) and having a reduced methane content preferably has a temperature of between 950 ° C. and 1100° C. and more preferably a temperature between 980 ° C. and 1050° C. The methane conversion in step (g) is suitably between 10 wt % and 50 wt %.

Figure 2:
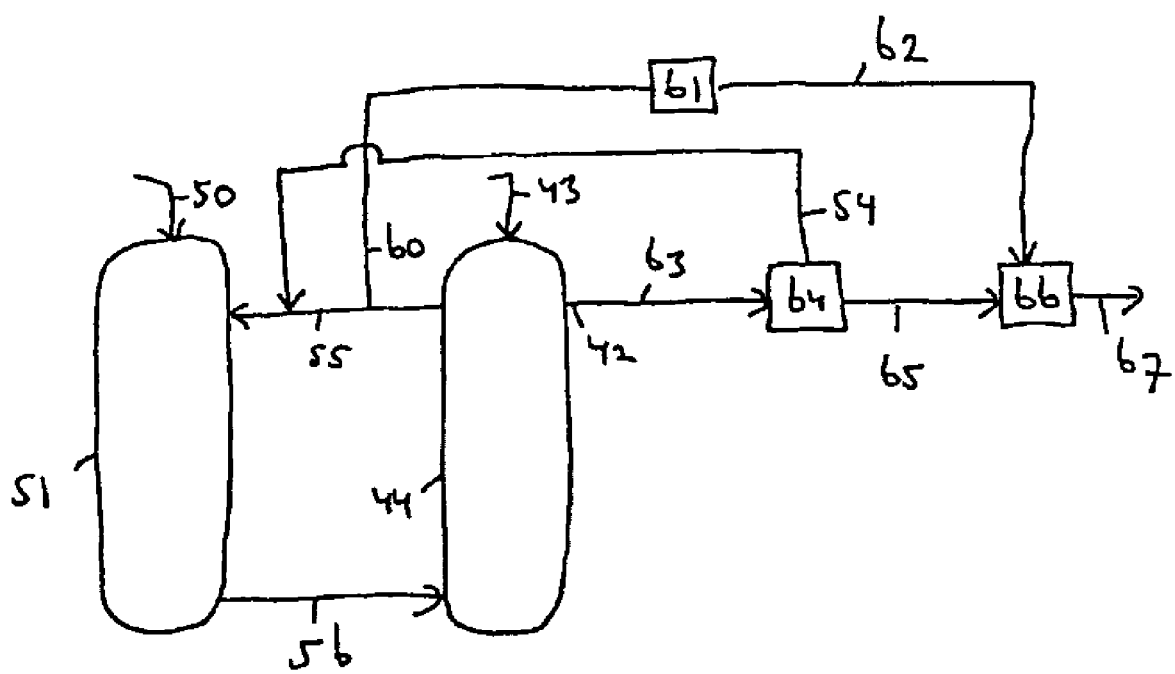
FIG. 2 illustrates an integrated process involving the installation of FIG. 1, a Fischer-Tropsch synthesis and some of its downstream unit operations.

Also shown in FIG. 1 is how part (60) of the steam reformer product (55) having a relatively high hydrogen over carbon monoxide molar ratio is separated from steam reformer product (55). In FIG. 2 is shown how this stream (60) is fed according to step (c) to a hydrogen recovery unit (61) to obtain hydrogen (62) suitable for use in hydroprocessing unit(s) (66).

The molar hydrogen to carbon monoxide ratio in steam reformer product (60) is higher than 2, preferably higher that 3 and typically not greater than 6. The hydrogen recovery unit (61) may be well known membrane separation units, pressure swing absorbers or combinations of a membrane unit followed by a pressure swing absorber.

The synthesis gas (63) as obtained by the above process may advantageously be used as feedstock for a Fischer-Tropsch synthesis process, methanol synthesis process, a di-methyl ether synthesis process, an acetic acid synthesis process, ammonia synthesis process or to other processes which use a synthesis gas mixture as feed for example, processes involving carbonylation and hydroformylation reactions. To steps (a) and (b) preferably recycle gases are fed. These recycle gasses are obtained in, for example the above exemplified, processes which use the synthesis gas as prepared by the process according to the invention. These recycle gasses may comprise $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, or acetic acid may be present.

The invention is especially directed to the above process for the preparation of additional steps (d) hydrogen and carbon monoxide containing gas (synthesis gas), wherein (e) and (f) are also performed. In step (d) the synthesis gas is catalytically converted using a Fischer-Tropsch catalyst into a hydrocarbons comprising stream. In step (e) the hydrocarbons comprising stream of step (d) is separated into a hydrocarbon product and a gaseous recycle stream. Suitably the hydrocarbon product comprises hydrocarbons having 5 or more carbon atoms, preferably having 4 or more carbon atoms and more preferably having 3 or more carbon atoms. The gaseous recycle stream may comprise normally gaseous hydrocarbons produced in the synthesis process, nitrogen, unconverted methane and other feedstock hydrocarbons, unconverted carbon monoxide, carbon dioxide, hydrogen and water.

In step (e) the recycle stream is fed to step (a) and/or (b). Preferably the recycle stream is supplied to the burner of step (a) or directly supplied to the interior of the partial oxidation reactor.

Optionally part or all of the carbon dioxide present in such a recycle stream is separated from said recycle stream before being fed to step (a). Part of the carbon dioxide may suitably be fed to step (a).

Step (d) and (e) may be performed by the well known Fischer-Tropsch processes which are for example the Sasol process and the Shell Middle Distillate Process. Examples of suitable catalysts are based on iron and cobalt. Typical reactor configurations include slurry reactors and tubular reactors. These and other processes are for example, described in more detail in EP-A-776959, EP-A-668342, U.S. Pat. No. 4,943,672, U.S. Pat. No. 5,059,299, WO-A-9934917 and WO-A-9920720, all of which are herein incorporated by reference.

FIG. 2 illustrates the configuration of FIG. 1 in combination with a Fischer-Tropsch synthesis process unit (64) and its downstream hydroconversion unit(s) (66). In addition to FIG. 1 FIG. 2 shows how the synthesis gas (63) is fed to Fischer-Tropsch synthesis process unit (64). In unit (64) a gaseous recycle stream (54) is separated from the hydrocarbon product (65) and recycled to partial oxidation reactor (51).

In the hydroprocessing units the hydrocarbon product present in (65), comprising typically a relatively large portion of compounds boiling above 370° C., is converted by well-known hydrocracking and hydroisomerization processes to middle distillates, for example kerosene or gas oil products. Any remaining residue may be further converted to base oils by catalytic dewaxing processes (not shown), which also require hydrogen. Examples of such downstream hydroprocessing units are described in for example WO-A-0107538, WO-02070631, WO-02070629 and WO-02070627, all of which are herein incorporated by reference, and in the references cited in these publications.

The hydroprocessing unit (66) may also be a hydrogenation unit in which the oxygenates and olefins as present in a Fischer-Tropsch synthesis product (65) are selectively converted in the presence of hydrogen and a suitable hydrogenation catalyst, to paraffins in order to obtain a variation of products comprising substantially normal paraffins. Examples of these products are solvents boiling in the naphtha to kerosene range, linear detergent feedstocks having carbon numbers between 109 and 19 and waxes having congealing points between 30 ° and 150° C.

The invention claimed is:

1. A process for the preparation of hydrogen and a gas containing a mixture of hydrogen and carbon monoxide from methane, said process comprising:
    (a) partially oxidizing methane via a non-catalyzed reaction to prepare an effluent comprising a mixture of hydrogen and carbon monoxide having a temperature of above 700° C.,
    (b) catalytically steam reforming methane in a zone wherein the feed has a steam to carbon ratio of less than 1 to prepare a steam reforming product having a hydrogen to carbon monoxide molar ratio of greater than 2, wherein heat for the steam reforming reaction is provided by convective heat exchange between the steam reformer reactor zone and the effluent of step (a), and
    (c) separating hydrogen from part of the steam reforming product of step (b) and feeding part of the steam reforming product of step (b) to step (a).

2. The process of claim 1, wherein the steam reforming product has a hydrogen to carbon monoxide molar ratio between 3 and 6.

3. The process of claim 1, wherein hydrogen is separated by membrane separation, by a pressure swing absorber step or by a membrane separation followed by a pressure swing absorber step.

4. The process of claim 1, wherein in step (c) hydrogen is separated from a part of the steam reforming product to produce a remainder part and that the remainder part of the steam reforming product, and the effluent of step (a) as obtained in step (b) is combined after having supplied heat to the steam reforming reactor zone in step (b).

5. The process of claim 1, wherein the part of the steam reforming product is fed to step (a) such that this stream is mixed with the effluent of the partial oxidation such that the temperature of the effluent of the partial oxidation is reduced by between 250° C. and 500° C.

6. The process of claim 1, wherein the convective steam reformer zone comprises a tubular reactor provided with one or more tubes containing a reforming catalyst.

7. The process of claim 1 further comprising:
    (d) catalytically converting the hydrogen and carbon monoxide into a stream comprising hydrocarbons via a Fischer-Tropsch process.

8. The process of claim 7 further comprising:
    (e) separating the stream of step (d) into a hydrocarbon product and a gaseous recycle stream wherein the gaseous recycle stream is fed to step (a) or step (b).

9. The process of claim 8 further comprising:
    (f) hydroconverting the hydrocarbon product of step (e) with the hydrogen from step (c).

10. The process of claim 9 wherein step (f) comprises hydrogenation.

11. The process of claim 9 wherein step (f) comprises hydroisomerization.

* * * * *